United States Patent Office 2,947,063
Patented Aug. 2, 1960

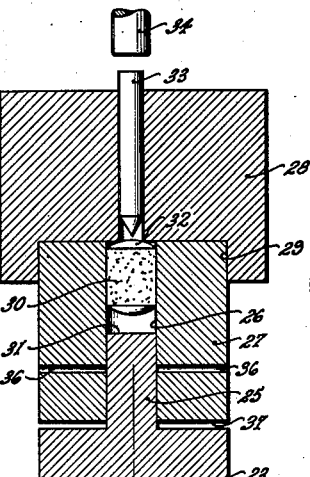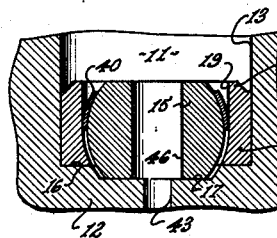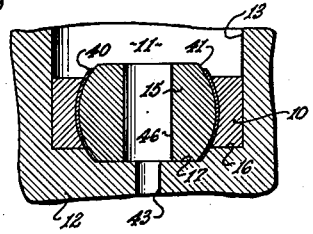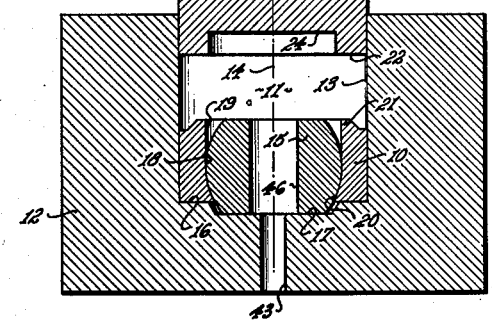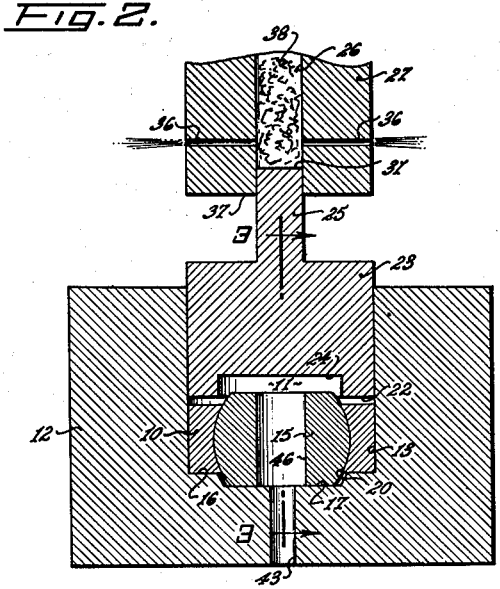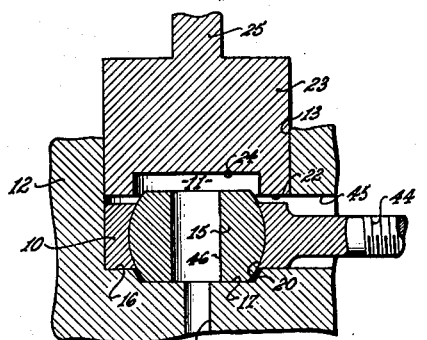

2,947,063
APPARATUS AND METHOD FOR FORMING SELF-ALIGNING BEARINGS

Gifford H. Teeple, Jr., Manhattan Beach, Calif., assignor to T.N.T. Corporation, Los Angeles, Calif., a corporation of California Filed Nov. 12, 1957, Ser. No. 695,649

12 Claims. (Cl. 29—149.5)

This invention relates generally to the manufacture of what are known as two-piece, self-aligning bearings especially rod end bearings, and more particularly has to do with apparatus and methods for swaging metallic bearing housings about spherical ball surfaces, in such a way that turning clearance between the ball and the housing is developed during swaging.

In the past bearing housings having generally been coined or otherwise formed over bearing balls in such a way that the contact surfaces conform and produce a tight connection so that the ball is no longer free to move or turn in the race. The desired clearance to permit turning of the ball in the race was then developed by such methods as allowing the ball, which had been previously heated, to contract radially, or by further processing the bearing housing, as for example, pressure rolling the crown of the housing thereby relieving the tight connection between the housing and the ball. All of these methods have disadvantages associated therewith, such as lack of controlled heating and hence uneven contraction of the ball in the first case so that proper clearance does not develop after cooling, and the cost of performing additional operations upon the bearing housing in the other case, which operations do not always result in the development of required clearance in production. Also, rolling of the bearing housing crown tends to produce an undesirable out-of-round condition as between the housing and ball.

The present invention has for its major object the provision of bearing-forming apparatus and a novel method for forming bearings of the two-piece self-aligning type, which eliminates the disadvantages inherent in prior forming processes of the type described above. Briefly, and referring first to the method contemplated, it involves swaging the metallic bearing housing about a spherical ball surface by means of a punch that is guided for axial movement toward and away from the housing, the punch having an annular shoulder facing the bearing housing side to be swaged. The method includes the steps of detonating an explosive charge against the rearward side of the punch so that the latter explosively accelerates forwardly and axially toward the bearing housing causing the punch annular shoulder to impact against the housing side, swaging and elastically compressing the housing metal about the ball, and thereafter allowing the punch to rebound rearwardly from the housing thereby permitting the swaged and elastically compressed housing metal to rebound substantially from the ball for developing ball turning clearance in the housing. The method distinguishes itself from prior swaging processes for forming bearings of this type in that the housing metal is elastically compressed in addition to being swaged as a result of the explosive acceleration of the punch and rebounding thereof away from the bearing housing after impacting thereagainst. Thus, where prior processes were satisfied by mere swaging of the housing metal into contact with the ball surface, the present method introduces impact compression of the housing metal taking full advantage of the elasticity or springback characteristics of the metal by allowing the latter to rebound or spring back away from the ball surface during or after the actual swaging permanent deformation of the metal toward and typically against the ball, thereby developing the desired turning clearance.

The apparatus used in accomplishing the above object and method comprises the punch movable forwardly along an endwise extending axis and having a forwardly facing annular shoulder centered about that axis, die means forward of the punch for confining the periphery of the housing and holding the latter centered about said axis with the side of the housing to be impact swaged spaced from and in the path of punch shoulder movement, and a chamber at the rearward side of the punch and into which the punch extends to receive application of explosive pressure causing the described punch acceleration and impact against the housing. Further, rebound of the punch away from the housing is provided for by exhausting of the explosion gas pressure through a chamber port during punch travel toward the bearing housing, so that the explosive pressure is released prior to punch impact against the housing.

These and other features and objects of the invention, as well as the details of an illustrative embodiment, will be more fully understood from the following detailed description of the drawings, in which:

Fig. 1 is a vertical section taken through the apparatus for forming the bearing housing;

Fig. 2 is a view similar to Fig. 1 showing the formed bearing and the punch immediately after impact swaging of the bearing housing;

Fig. 3 is a section taken on line 3—3 of Fig. 2;

Fig. 4 is a fragmentary vertical section showing an insert between the bearing housing and ball prior to swaging of the housing; and Fig. 5 is a view similar to Fig. 4 showing the swaged housing and drawn insert.

In Figs. 1 through 3 the substantially annular and metallic rod end bearing housing 10 is shown received in a cylindrical recess 11 and a die 12, with the recess bore 13 confining the periphery of the housing against radial swaging away from vertical axis 14. The housing 10 and segmented spherical ball 15 are respectively supported by the inner surfaces 16 and 17 of the die recess 11, with the ball received in the housing socket 18 that is cylindrical at the mouth 19 of the socket and narrows radially inwardly at the opposite preformed side 20 of the housing. The bearing housing upper side to be swaged has an annular lip 21 forming the mouth 19 and it is vertically spaced below the annular downwardly protruding shoulder 22 of a punch 23 the cylindrical body of which is slidably received in the bore 13 of recess 11, so that the punch shoulder 22 is adapted to impact against the entire upper surface of the bearing housing during the impact swaging process.

The main body of the massive punch 23 is cylindrical for slidable reception in the die bore 13, and its forward or lower end is recessed at 24 to fit over or receive the ball 15 during swaging as viewed in Fig. 2, so that the ball itself will not be subjected to impact. The punch has a vertical extension or cylindrical plunger 25 extending axially upwardly from its upper or rearward side, the plunger being slidably received in bore 26 of a thick tube 27 extending axially upwardly above the main body of the punch. A breech block 28 fits over and receives the upper end of the tube 27 into a bore 29 in the block, so that the block and tube together form a chamber in which an explosive charge 30 is receivable in bore 26 above the piston face 31 of the plunger. At the upper side of the explosive charge is a detonator 32 adapted to be struck by a firing pin 33 slidably received in the breech block, a typical striking hammer 34 being shown as engageable with the firing pin 33 causing the latter to strike the detonator and explode the charge 30.

Upon detonation of the charge, which is controlled, and preferably comprises a very fast burning powder, the explosive force is applied against the piston face 31 explosively accelerating the punch 23 downwardly toward the die so that the hardened punch shoulder 22 impacts against the housing lip 21, swaging and elastically compressing the housing about the ball as viewed in Fig. 2. Whereas relatively slow swaging of the housing metal could not elastically compress the metal, it is characteristic of the present process that explosive acceleration of the punch to high velocity prior to engagement with the bearing housing and impact thereagainst causes not only cold swaging of the housing about the ball but also imparts elastic compression to the swaged metal permitting the latter to rebound sufficiently from the ball for development of ball turning clearance in the housing.

In order that the housing metal may freely elastically rebound to develop the desired clearance, the punch is permitted or allowed to rebound upwardly as a result of the impact against the housing and to the typical position as shown in Figs. 2 and 3. The punch is enabled to rebound by release of the gas pressure behind the plunger 25 through ports 36 so that the gas 38 in the bore 26 will be at substantially reduced pressure to permit punch rebounding. It is found that the pressure release of the gas to the substantially low level should be accomplished prior to punch impact against the housing in the first instance. Accordingly, the ports are spaced sufficiently from the mouth end 37 of the tube 27 that the piston face 31 of the plunger clears the ports during downward plunger travel prior to plunger impact against the housing. In other words, travel of the punch toward the bearing housing is greater than travel of the piston face 31 to a position opposite the ports 36.

In Figs. 4 and 5 a modified bearing is illustrated having an annular metallic insert 40 spherically seated on the spherical surface 41 of the ball 15 within the housing socket 19. The insert is hemispheric, segmented, preferably though not necessarily of uniform thickness, and in axial alignment with axis 14 of the punch, die bore 13 and housing 10. Typically made of a metal softer than the steel bearing and housing, such as indium, lead, tin, atimony, bismuth, or alloys thereof, or a solder, the insert extends in the wide socket clearance between the ball and housing lip 21 so as to be subject to compression and drawing during impact swaging of the lip metal toward the ball as illustrated in Fig. 5.

During such swaging, the insert extrudes outwardly from the socket mouth and inwardly and downwardly between the ball and housing, maintaining clearance therebetween during impact swaging, which is carried out and predetermined so as to draw out the insert to occupy somewhat less than the desired final clearance between the ball and housing. For example, the insert may have an initial uniform thickness of from .001 to .010 inch and will be drawn to have considerably lesser thickness positively preventing any face-to-face high pressure contact between the housing and ball during impact swaging. The final clearance between the housing and ball developed by springback of the swaged housing metal away from the ball and insert and by removal of the insert, as for example by melting out the latter, will be in the range of from .0005 to .003 inch.

In all the drawing figures a vent 43 in die 12 is shown communicating with recess 11 for passing air trapped therein to the exterior during travel of the punch into the die, thereby preventing build-up of air pressure exertion against the punch during such travel. Fig. 3 illustrates a threaded shank 44 integral with bearing housing 10, as is typical of self-aligning rod end bearing assemblies, the shank protruding laterally through a side opening 45 in the die. Also the ball 15 in each of the views has a central bore 46 for receiving a rod to be connected with the ball in use.

I claim:

1. Apparatus for impact swaging a metallic substantially annular bearing housing about ball surface, comprising a cylindrical punch movable forwardly along an endwise extending axis and having a forwardly projecting annular shoulder centered about said axis, said punch including a rearwardly extending reduced cross section plunger, a die forward of the punch for confining the periphery of said housing and holding the housing centered about said axis with the side of the housing to be impact swaged spaced from and in the path of punch shoulder movement, and a chamber at the rearward side of the punch having an axial bore receiving said plunger for application of explosive gaseous pressure thereagainst accelerating the punch relatively away from said chamber and toward the die so that the punch impacts against the housing side swaging and elastically compressing the housing about the ball, said chamber having a vent covered by said punch and adapted to be uncovered thereby during punch free travel toward the bearing housing to effect release of explosive gases whereby the punch may rebound from the housing permitting the swaged and elastically compressed housing metal to rebound sufficiently from the ball for development of ball turning clearance in the housing.

2. The invention as defined in claim 1 in which said die has a cylindrical recess slidably receiving the forward portion of the punch for guiding the punch toward said housing.

3. The invention as defined in claim 1 including an explosive charge in said bore.

4. The invention as defined in claim 1 in which said chamber includes an axial tube receiving said plunger, and in which said vent comprises a port communicating between the exterior and the side of the plunger in said tube, the axial distance along the plunger between said port and the pressure receiving end of the plunger being less than the forward travel of said punch to impact with said housing.

5. The invention as defined in claim 4 including a breech block engaging the rearward end of said tube, said block having an axial opening communicating with said tube bore, and a firing pin axially movable in said opening toward said bore for detonating the explosive therein.

6. The combination, comprising a cylindrical punch movable forwardly along an endwise extending axis and having a forwardly projecting annular shoulder centered about said axis, said punch including a rearwardly extending reduced cross section plunger, a substantially annular bearing housing having a central socket and a ball inserted into said socket, die means confining the periphery of said housing and supporting the housing in centered relation about said axis with the side of the housing to be impact swaged spaced from and in the path of punch shoulder movement, and a chamber at the rearward side of the punch having an axial bore receiving said plunger for application of explosive gaseous pressure thereagainst accelerating the punch relatively away from said chamber and toward the die so that the punch impacts against the housing side swaging and elastically compressing the housing about the ball, said chamber having a vent covered by said punch and adapted to be uncovered thereby during punch free travel toward the bearing housing to effect release of explosive gases whereby the punch may rebound from the housing permitting the swaged and elastically compressed housing metal to rebound sufficiently from the ball for development of ball turning clearance in the housing.

7. The invention as defined in claim 6 in which said chamber includes an axial tube receiving said plunger, and in which said vent comprises a port communicating between the exterior and the side of the plunger in said tube, the axial distance along the plunger between said port and the pressure receiving end of the plunger being less than the forward travel of said punch to impact with said housing.

8. The invention as defined in claim 6 including a metallic annulus inserted into said socket between said ball and housing.

9. In the process of swaging a metallic substantially annular bearing housing about a ball wherein said housing and ball are placed in a die with the ball in said housing and said housing and ball are centered about an endwise extending axis with the side of the housing to be swaged extending transversely thereof, and wherein means including a punch is guided for axial movement forwardly toward and rearwardly away from said housing with a punch annular shoulder centered about said axis facing said housing side in oppositely spaced relation thereto, the steps that include detonating an explosive charge against the rearward side of said means thereby explosively accelerating the punch forwardly and axially toward the bearing housing so that the punch annular shoulder impacts against said housing side swaging and elastically compressing the housing metal about the ball, and allowing the punch to rebound rearwardly from the housing thereby permitting the swaged and elastically compressed housing metal to rebound sufficiently from the ball for development of ball turning clearance in the housing.

10. In the process of swaging a metallic substantially annular bearing housing about a ball wherein said housing and ball are placed in a die confining the housing with the ball in a housing socket and said housing and ball are centered about an endwise extending axis with the side of the housing to be swaged extending transversely thereof, and wherein a punch is guided for axial movement toward and away from said housing with a punch annular shoulder centered about said axis facing said housing side in oppositely spaced relation thereto, the steps that include detonating an explosive charge against the rearward side of the punch thereby explosively accelerating the punch forwardly and axially toward the bearing housing so that the punch annular shoulder impacts against said housing side swaging and elastically compressing the housing metal about the ball, and reducing the exertion of explosive pressure against the punch prior to said impacting allowing the punch to rebound freely rearwardly from the housing following said impact thereby permitting the swaged and elastically compressed housing metal to rebound sufficiently from the ball for development of ball turning clearance in the housing.

11. The method of claim 10 comprising substantially completely dissipating said explosive pressure against the punch while the punch is spaced from said housing.

12. In the process of swaging a metallic substantially annular bearing housing about a ball wherein said housing, the ball and an annular insert are placed in a die confining the housing with the insert extending about the ball in a housing socket and said housing, ball and insert are centered about an endwise extending axis with the side of the housing to be swaged extending transversely thereof, and wherein means including a punch is guided for axial movement forwardly toward and rearwardly away from said housing with a punch annular shoulder centered about said axis facing said housing side in oppositely spaced relation thereto, the steps that include detonating an explosive charge against the rearward side of said means thereby explosively accelerating the punch forwardly and axially toward the bearing housing so that the punch annular shoulder impacts against said housing side swaging and elastically compressing the housing metal against the insert thereby drawing said insert about the ball, and allowing the punch to rebound rearwardly from the housing thereby permitting the swaged and elastically compressed housing metal to rebound sufficiently for development of ball turning clearance in the housing after removal of said drawn insert.

References Cited in the file of this patent

UNITED STATES PATENTS

| 1,277,370 | Bovard | Sept. 3, 1918 |
| 2,141,098 | Wahlstrom | Dec. 20, 1938 |
| 2,724,172 | Potter | Nov. 22, 1955 |
| 2,728,975 | Potter | Jan. 3, 1956 |